INVENTOR.
Jess A. Lewis,
BY Hood, Gust & Irish
Attorneys.

Nov. 28, 1967   J. A. LEWIS   3,354,534
METHOD AND APPARATUS FOR AUTOMATIC TRANSMISSION REPAIR
Filed Dec. 21, 1964   3 Sheets-Sheet 3

INVENTOR.
Jess A. Lewis,
BY Hood, Gust & Irish
Attorneys.

3,354,534
METHOD AND APPARATUS FOR AUTOMATIC
TRANSMISSION REPAIR
Jess A. Lewis, 1230 Dell Cove Drive,
Fort Wayne, Ind. 46804
Filed Dec. 21, 1964, Ser. No. 419,919
9 Claims. (Cl. 29—402)

ABSTRACT OF THE DISCLOSURE

A method and apparatus for repairing an automatic transmission case having a crack in the central web portion thereof. The apparatus of the invention comprises an elongated and single piece bracket and a tubular spacer. The bracket has substantially parallel end portions separated by an intermediate portion. The bracket end portions are spaced from each other in directions longitudinal and lateral of said bracket and perpendicular to said longitudinal and lateral directions, and each end portion has an aperture therein. The spacer is cylindrical in shape and has a coaxial cylindrical passage extending between the opposite ends thereof and an exterior threaded portion. The method of the invention comprises the step of removing the bolt securing the rear servomotor of the transmission to the central web portion of the transmission case uncovering a threaded hole in the web and an unthreaded hole in the boring ring of the web, tapping the unthreaded hole, threadedly securing the spacer in the threaded hole of the web, inserting a bolt in one of the bracket apertures and the spacer passage and threadedly securing the bolt to the bearing ring thereby securing the bracket to the bearing ring with the web and servomotor therebetween, securing the remaining bracket end portion to the web at a position spaced from the crack and placing the bracket in tension to close the crack.

Figure 1:
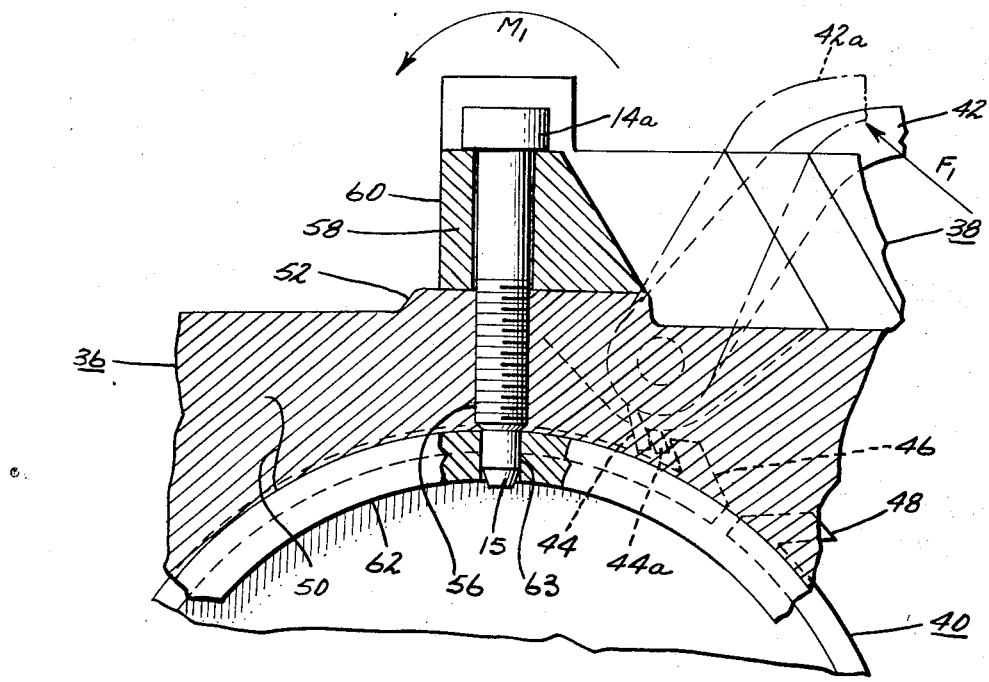

This invention relates to a method and apparatus for repairing an automatic transmission, and more specifically, to a method and apparatus for repairing an automatic transmission case which is cracked thereby to make the automatic transmission case useful and to eliminate the need for a replacement therefor.

In automatic transmissions which have a center web portion in the case and a rear servomotor which selectively actuates the rear clutch of the transmission that is suspended between the web portion and an exterior wall of the case, the web portion commonly becomes cracked in one or more places from the force exerted on the web portion whenever the servomotor is actuated. In Ford "Cruisimatic" and Mercury "Multidrive" transmissions, these cracks usually occur in the approximate positions of the web shown in FIGS. 1, 2 and 3 of the drawings. With such cracks in the web portion of the transmission case, the actuation of the servomotor does not completely secure the clutch band to the clutch cylinder as the servomotor itself is allowed to move by the opening of the cracks thereby allowing the clutch band to slip on the clutch cylinder and resulting in ineffective power coupling from the engine to the drive shaft of the automobile. Heretofore, whenever the web portion of the transmission case became cracked as afore-mentioned, the transmission case would have to be replaced and the transmission reassembled in a new transmission case. This operation was costly both from the expense of providing a new transmission case and from the expense of labor required to disassemble the parts of the transmission and reassemble them in a new transmission case. Therefore, it is desirable to provide a relatively simple and inexpensive method and apparatus for repairing the cracked web of an automatic transmission case which only necessitates the removal of a few parts of the transmission and eliminates the need for replacing the transmission case thereby substantially reducing the cost of such a repair.

It is therefore an object of this invention to provide a method for repairing a cracked and heretofore unusable transmission case which does not necessitate the complete disassembly of the transmission.

It is another object of this invention to provide an improved method of mounting the rear servomotor on a cracked web of an automatic transmission case thereby rendering the case useful and eliminating the need for replacement thereof.

It is yet another object of this invention to provide an improved method by which the rear servomotor of an automatic transmission can be mounted on the cracked web of an automatic transmission case in such a manner that the cracks are closed, even upon actuation of the servomotor, thereby to minimize the effects of the cracked web and reduce the further propagation of the cracks through the web.

It is another object of this invention to provide an improved repair bracket apparatus for repairing a cracked and heretofore unusable automatic transmission case.

It is another object of this invention to provide an improved repair bracket apparatus that can be used to repair a cracked and heretofore unusable automatic transmission case without requiring more than a few parts to be removed from the transmission case.

It is still another object of this invention to provide an improved repair bracket apparatus, which, when used to mount the rear servomotor on a transmission case having a cracked web, eliminates the effect of the cracked web and the need for replacing said transmission case.

A further object of this invention is to provide an improved repair bracket which, when used to mount the rear servomotor onto a transmission case having a cracked web, applies force to the cracked web in a manner so as to close the cracks therein and to prevent further propagation of the same.

Still further an object of this invention is to provide an improved repair bracket for mounting the rear servomotor onto a cracked transmission case whereby the forces created by the actuation of the servomotor are opposed by the bracket thereby to hold the cracks in the web of the transmission case closed at all times.

Figure 2:
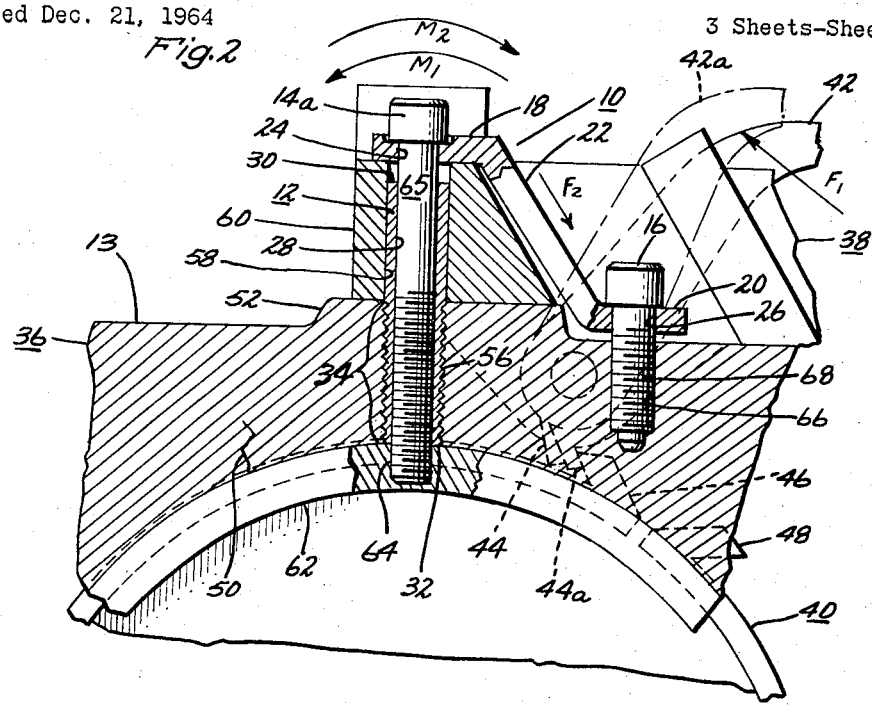
Figure 3:
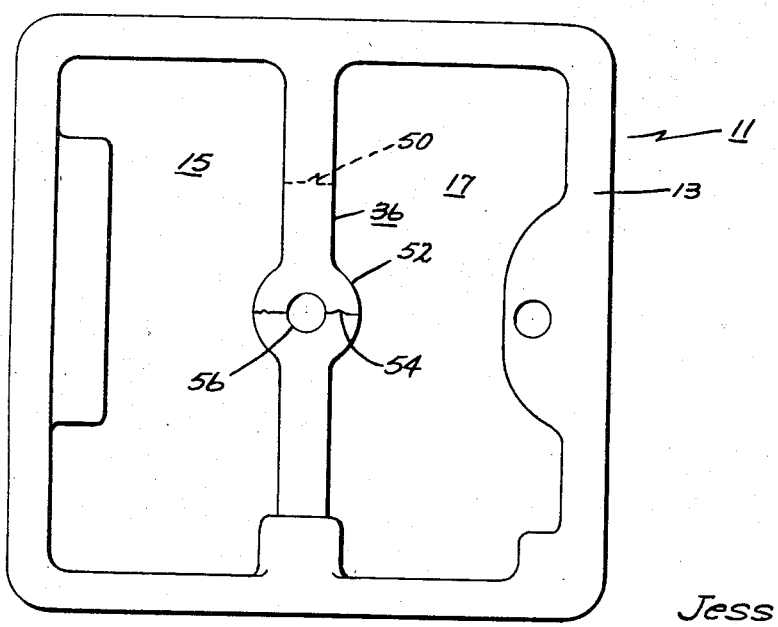
Figure 4:
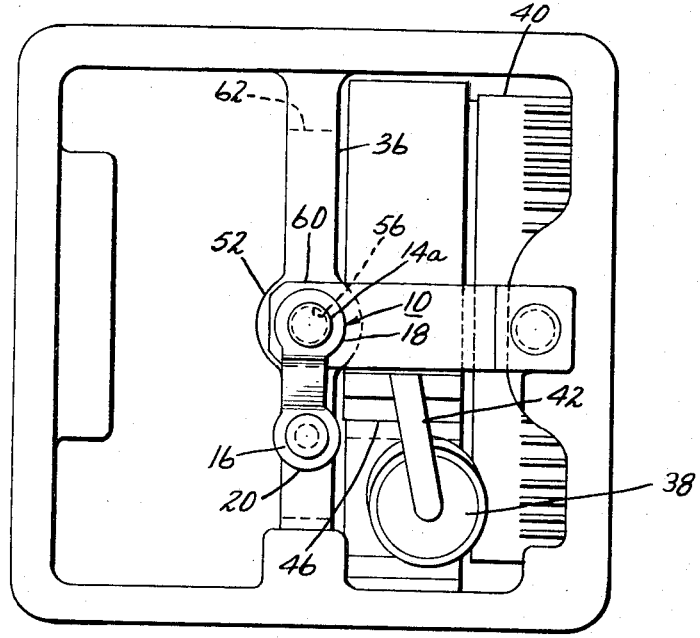
Figure 5:
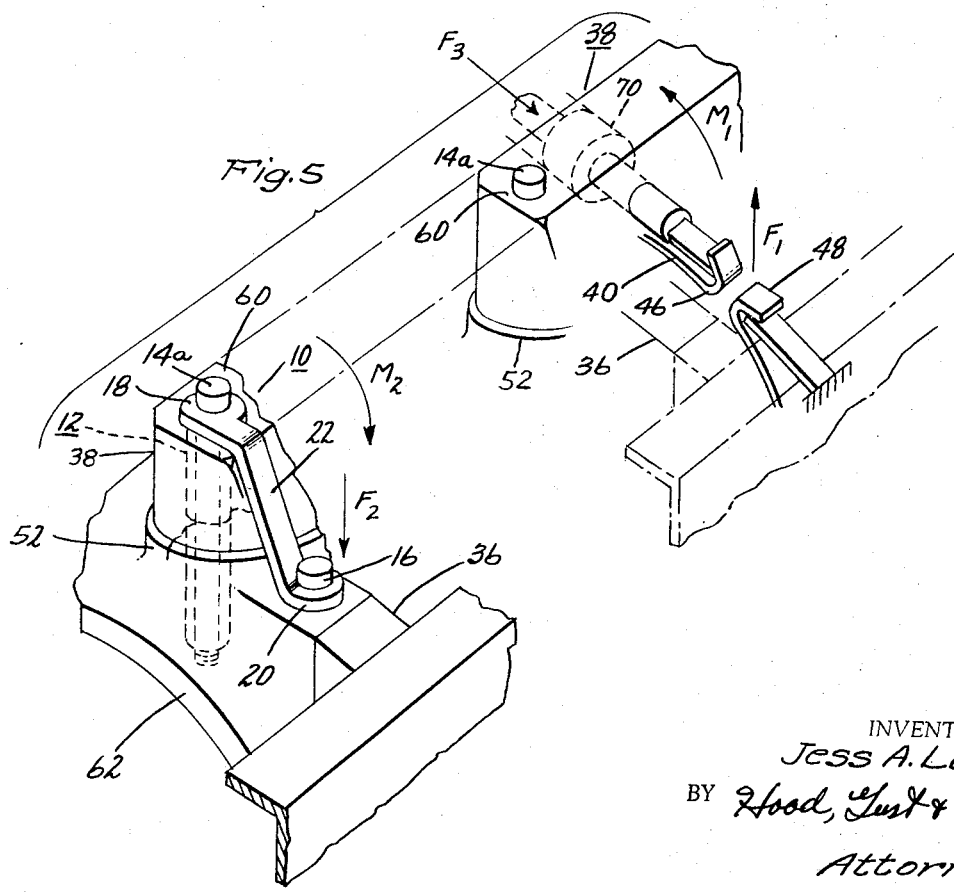

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a fragmentary view, partially in cross-section, showing the prior art method of mounting the rear servomotor on the web portion of a transmission case and illustrating the servomotor in its unactuated (dotted) and actuated (solid) positions. Diagrammatically shown also is one position at which cracks are likely to occur in the web portion of the automatic transmission case and the force, F(1), and its moment, M(1), created by the actuation of the rear servomotor;

FIG. 2 is a fragmentary view, partially in cross-section and similar to FIG. 1, showing a cracked web of a transmission case with the rear servomotor mounted thereon by means of the improved bracket device of this invention. Diagrammatically shown also is the force, F(2), and its moment, M(2), created in the web by the bracket of this invention so as to oppose the moment, M(1), illustrated in FIG. 1;

FIG. 3 is a bottom surface view of a cracked automatic transmission case having a web portion and diagrammatically showing two cracks, one in the position illustrated in FIG. 1 (dotted), the other in another likely position for a crack to occur;

FIG. 4 is a bottom surface view of the transmission case showing the rear servomotor mounted on the transmission case by means of the improved bracket device of this invention; and FIG. 5 is a perspective fragmentary view of this invention showing diagrammatically how the repair bracket operates in opposition to the rear servomotor of the transmission to hold the cracks in the web portion of the transmission case closed.

In the broader aspects of this invention there is provided an improved bracket apparatus having adjacent both ends a means for securing the bracket to the web portion of an automatic transmission case and a method for repairing the cracked transmission case utilizing said bracket apparatus. The method of this invention comprises securing one end of the bracket apparatus to the web portion of the automatic transmission case adjacent the cracks therein a manner such as to render the bracket, web, and the rear servomotor immovable with respect to each other; securing the other end of the bracket apparatus to the web at a position spaced from the cracks therein; and placing the bracket in tension longitudinally thereof thereby to exert a force on the web portion so as to close the cracks therein and prevent further propagation of the cracks through the web.

Referring to the drawings, there is shown a bracket apparatus which can be used to repair a cracked automatic transmission case comprising a repair bracket 10, a cylindrical spacer 12, and two bolts 14a, 16. Repair bracket 10 has substantially parallel end portions 18, 20 and an intermediate portion 22 therebetween. End portions 18, 20 are spaced from each other in directions longitudinal, lateral, and perpendicular thereto, and each of the end portions 18, 20 has a centrally located aperture 24, 26, respectively, therein.

The cylindrical spacer 12 has a coaxial passage 28 extending therethrough and communicating with the opposite ends 30, 32. Adjacent end 32 is a threaded portion 34 which extends from end 32 to a portion intermediate ends 30, 32 on the exterior surface of the spacer 12.

This bracket and spacer combination is used to repair a cracked automatic transmission case 11 in a manner so as to make the transmission case useful and to eliminate the need for the replacement thereof. Such transmission cases are usually cast out of a material such as iron, aluminum or the like and commonly become cracked in the web portion 36 from the repetitive actuation of the rear servomotor 38 which is connected to the rear band 40 by means of a fluid actuated lever 42. Upon actuation of the lever 42 into the position 42a the distal end 44 of the lever 42 engages the ear 46 of the band 40 and moves the ear 46 toward the ear 48 which is connected to the transmission case and remains stationary. This movement of the ear 46 secures the clutch band 40 onto the clutch cylinder (not shown) and tends to lift the servomotor 38 away from the web 36 as diagrammatically indicated by force, F(1), of FIG. 1. This force, F(1), is translated into a moment, M(1), about a bolt 14 which is used in the prior art to secure the rear servomotor 38 to the web portion 36 of the transmission case. The repeated application of the moment, M(1), to the web 36 by the repeated actuation of the rear servomotor 38 may create a crack in the transmission case generally in either or both of two approximate positions. One position that a crack may occur is shown in FIGS. 2 and 3 and indicated by the reference numeral 50. An additional crack may occur in the boss 52 of the web portion 36 as indicated by the reference numeral 54 of FIG. 3. As can be seen in FIGS. 1 and 2, when the rear servo 38 is actuated and the lever 42 moves into the position 42a, the distal end 44 moves only a short distance into the actuated position 44a. This distance between positions 44, 44a may be less than ¼ of an inch. Therefore, when the web is cracked as at 50, 54 the opening of the crack by means of the moment M(1), when the rear servomotor 38 is actuated, can result in the distal end 44 not reaching the position 44a but instead stopping at a position intermediate positions 44, 44a. When this happens, the clutch band 40 is not fully secured to the clutch drum and the band 40 will slip on the clutch drum surface and thereby cause a loss of power in the drive mechanism of the car. If this slippage is excessive, the transmission fails completely and renders the vehicle immovable in one or more gear ratios.

The bracket 10 and spacer 12, as above-described, can be used in the method of this invention to mount the rear servomotor 38 on the web 36 which is cracked at 50 and/or 54, in a manner that solves the afore-mentioned difficulty. The method of this invention, which will now be described, comprises, first, removing of the bolt 14 from the threaded opening 56 in the web portion 36 and from the unthreaded opening 58 in the rear or case portion 60 of the rear servomotor 38 which overlies the boss 52 of the web portion 36. Opening 56 is bottomed by the bearing ring 62 which is secured in the web 36 and in which is supported the bearing which supports the two clutch drums located in the two portions 15 and 17 of the transmission case, respectively, as defined by the web portion 36 and shown in FIG. 3. Bearing ring 62 has a coaxial hole 63 therein into which tip 15 of bolt 14 originally fits as shown in FIG. 1.

Second, hole 63 in bearing ring 62 is tapped so as to provide a threaded opening 64 in the bearing rim 62 which is coaxial with the threaded opening 56 in the web 36. Opening 64 has a diameter equal to the diameter of the passageway 28 of the spacer 12 and smaller than the opening 56.

Third, the spacer 12, which has an exterior diameter substantially the same as openings 56 in the web and 58 in the case portion 60 is threaded into the opening 56 in such a manner that threaded portion 34 lies within web 36 and the unthreaded portion of the spacer 12 adjacent end 30 extends vertically upward from the boss 52 of the web portion 36. The passageway 28 of the spacer 12 is thereby positioned coaxially and in registry with threaded opening 64 in the bearing ring 62.

Fourth, the case portion 60 having the opening 58 therein is placed over the spacer 12 and positioned in mounting position as illustrated in FIG. 2.

Fifth, the repair bracket 10 is positioned so as to place opening 24 in end portion 18 in registry with and coaxially of the passageway 28 of the spacer 12 and the threaded opening 64 in the bearing ring 62. In this position, the intermediate portion 22 and the upper end portion 20 are spaced apart from web 36 and the servomotor 38, and the end portion 20 is in registry with a portion of web 36 which is spaced from the cracks 50, 54. Bolt 14a is then inserted in the opening 24, through the passageway 28 and threadedly secured in the opening 64 of the bearing ring 62 thereby securing bracket 10 to the bearing ring 62 with the web 36 and the servomotor therebetween. Bolt 14a has a stud portion 65 which has an outside threaded diameter equal to the diameter of passageway 28 thereby rendering the bracket 10, the web 36, the servomotor 38, and the bearing ring 62 immovable with respect to each other, when the bolt 14a is properly secured in the opening 64.

Sixth, an opening 66 is drilled and tapped in web portion 36 so as to be in registry with opening 26 of the bracket 10.

Seventh, bolt 16 is inserted through opening 26 and threadedly secured into the threaded opening 66. Bolt 16 has a stud portion 68 which has a diameter equal to the diameter of opening 26 thereby rendering bolt 16 laterally immovable therein. Bolt 16 is tightened so as to place the bracket 10 in tension longitudinally thereof in the manner indicated in FIG. 2 by force, F(2). Force, F(2), thereby creates a moment, M(2), about the point of securance of the servomotor 38 in the web 36 thereby to counteract and offset the moment, M(1), heretofore described. By the proper tightening of bolt 16, the moment, M(2), may be selectively chosen of a magnitude such as to close the cracks 50, 54 in the web 36 and to minimize the opening thereof whenever servomotor 38 is actuated thereby to prevent the further propagation thereof in the web 36.

The invention heretofore described is illustrated diagrammatically in FIG. 4. As shown, the moment, M(1), is created in the web portion 36 by means of the force, F(3) being applied to the piston 70 of the rear servomotor 38. When the rear servomotor 38 is so actuated, band 40 is secured to clutch cylinder (not shown) and the moment, M(1), is applied to the web 36 about bolt 14a. However, whenever the bracket 10 of this invention is used to mount the rear servomotor 38 as afore-mentioned, the portion 60 is rendered immovable transversely of bolt 14 and with respect to the web 36 and is as rigid as it was before the web portion 36 became cracked and the portion 60 was secured to the web portion 36 by means of bolt 14 as shown in FIG. 1. By the selective tightening of bolt 16, the bracket 10, as afore-mentioned, is placed in tension longitudinally thereof and creates force, F(2), and moment, M(2), in the web 36 which closes cracks 50, 54 and opposes the moment, M(1), created by the actuation of the rear servomotor 38. By providing a mounting of the rear servomotor 38 which renders it immovable with respect to the web portion 36, as by means of the spacer 12 and the bolt 14 of this invention, and by providing the bracket 10 which created a moment, M(2), to oppose the moment, M(1), the rear servomotor 38 is mounted onto web 36 in a manner that cracks 50, 54 are closed and cannot open upon the actuation of the rear servomotor 38. This results in providing that when lever 42 is moved, by actuation of the rear servomotor 38 into position 42a, the distal end 44 moves the entire distance into position 44a thereby securing band 40 to the clutch cyinder (not shown) which cures the defect afore-mentioned.

While there have been described above the principles of this invention in connection with specific apparatus, it is to be clearly understood that this description is made only by way of example and not as a limitation to the scope of the invention.

What is claimed is:

1. In an automatic transmission of the class wherein the transmission is housed in a transmission case having a bottom surface, a center web dividing the interior of said case into two portions, a threaded opening in said web communicating with said surface, and at least one crack in said web, and which includes a rear clutch cylinder positioned in one of said case portions, a bearing ring secured in said web, a tightenable rear clutch band partially surrounding said rear clutch cylinder, said clutch band being secured at one end to said case, and a servomotor having a mounting ear with a hole therein, said servomotor being secured to and in suspension between said case and said web with said mounting ear hole in registry with said web opening, said servomotor having a fluid actuated portion connected to the other end of said clutch band which when actuated secures said band to said cylinder and opens said crack; the combination with said web and servomotor of an elongated repair bracket of strip material having substantially parallel end portions and an intermediate portion therebetween, said end portions being spaced from each other in directions longitudinal and lateral of said bracket and perpendicular to said longitudinal and lateral directions, each of said end portions having a centrally located aperture therein, a cylindrical spacer having a coaxial passage extending therethrough and an exterior threaded portion adjacent one end thereof, said spacer being threadedly secured in said opening in said web and extending into said hole in said ear, one of said end portions of said bracket overlaying said mounting ear with the respective one of said apertures being in registry with said hole therein, a first bolt being positioned in said one bracket aperture and said spacer passage and being secured to said bearing ring thereby securing said bracket to said ring with said web and ear therebetween, said first bolt and said spacer being coaxial with said opening and said hole, said first bolt having an unthreaded portion which has an outside diameter substantially equal to the diameter of said spacer passage and said one bracket aperture whereby said first bolt is laterally immovable in said passage and said one aperture thereby to render said bracket, web, servomotor and ring immovable with respect to each other, said intermediate and other end portions of said bracket being spaced apart from said ear, servomotor and web, said web having a second threaded opening therein in registry with the other bracket aperture and spaced apart from said crack, and a second bolt positioned in the other bracket aperture and second web opening and threadedly secured to said web, thereby securing said other end portion of said bracket to said web, said bracket being in tension longitudinally of said bracket, whereby said bracket closes said crack and minimizes the opening of said crack when said servomotor is actuated.

2. In an automatic transmission of the class wherein the transmission is housed in a transmission case having a web dividing the interior of said case into two portions with at least one crack in said web, and which includes a rear clutch cylinder positioned in one of said portions, a bearing ring secured in said web, a tightenable rear clutch band partially surrounding said rear clutch cylinder and being secured at one end to said case, and a servomotor having a mounting portion secured to and in suspension between said case and said web, said servomotor having a fluid actuated portion connected to the other end of said band which when actuated secures said band to said cylinder and opens said crack; the combination with said web and servomotor of an elongated repair bracket having opposite end portions and an intermediate portion therebetween, said end portions benig spaced from each other in directions longitudinal and lateral of said bracket and perpendicular to said longitudinal and lateral directions, one of said bracket end portions being secured to said bearing ring with said web and servomotor mounting portion therebetween, said bracket, web, servomotor, and ring being immovable with respect to each other, said intermediate and other bracket end portions being spaced apart from said servomotor mounting portion and said web, said other bracket end portion being secured to said web at a position adjacent said servomotor mounting portion and spaced from said crack, said bracket being in tension longitudinally of said bracket, whereby said bracket closes said crack and minimizes the opening of said crack when said servomotor is actuated.

3. In an automatic transmission of the class wherein the trnasmission is housed in a transmission case having a web dividing the interior of said case into two portions with at least one crack in said web, and which includes a rear clutch cylinder positioned in one of said two portions, a bearing ring sceured in said web, a tightenable rear clutch band partially surrounding said rear clutch cylinder and being secured at one end to said case, and a servomotor having a mounting portion secured to and in suspension between said case and said web, said servomotor having a fluid actuated portion connected to the other end of said band which when actuated secures said band to said cylnider and opens said crack, the combination with said web and servomotor of a repair bracket having opposite end portions and an intermediate portion therebetween, one of said bracket end portions overlaying a portion of said servomotor mounting portion, first means for securing said bracket to said bearing ring with said web and servomotor mounting portion therebetween, said bracket, web, servomotor mounting portion and ring being immovable with respect to each other, said intermediate and other bracket end portion being spaced apart from said servomotor mounting portion and web, and second means for securing said other bracket end portion to said web at a position spaced from said crack, said bracket being in tension longitudinally of said bracket, whereby said bracket closes said crack and minimizes the opening of said crack when said servomotor is actuated.

4. In an automatic transmission of the class wherein the trnasmission is housed in a transmission case having a web dividing the interior of said case into two portions with at least one crack in said web, and which includes a clutch cylinder positioned in one of said two portions, a bearing ring secured in said web, a tightenable clutch band partially surrounding said clutch cylinder and being secured at one end to said case, and a servomotor having a mounting portion secured to and in suspension between said case and said web, said servomotor having a fluid actuated portion connected to the other end of said band which when actuated secures said band to said cylinder and opens said crack; the combination with said web and servomotor of a repair bracket, said repair bracket secured at one end to said bearing ring with said web and servomotor mounting portion therebetween, said repair bracket secured to said web at its other end at a position spaced from said crack, said bracket being in tension longitudinally of said bracket, whereby said bracket closes said crack and minimizes the opening of said crack when said servomotor is actuated.

5. The method of repairing an automatic transmission case having at least one crack in a web thereof comprising the steps of removing a first bolt securing the rear servomotor to said web from an opening in said servomotor and uncovering a first threaded bolt hole in said web bottomed by a bearing ring and a second unthreaded bolt hole in said bearing ring, tapping said second hole in said beariing ring from within said first bolt hole, said second hole being coaxial with and having a diameter smaller than said first hole, providing a cylindrical spacer having an exterior diameter equal to said first bolt and an interior passage extending therethrough having a diameter intermediate said diameter of said first bolt and said second hole, threadedly inserting said spacer into said first bolt hole and securing the same therein coaxially of said first bolt hole, said spacer having a portion extending beyond said web, placing said rear servomotor in its original position with said spacer portion extending into said opening in said servomotor, providing a repair bracket having opposite end portions and an intermediate portion therebetween, each of said end portions having an aperture therein, one of said apertures having a diameter equal to said diameter of said passage, positioning said bracket with one of said end portions over said servomotor with the respective one of said bracket apertures in registry with said spacer passage and with the other of said bracket end portions and said intermediate portion being spaced apart from said web and servomotor, said other bracket end portion being over a portion of said web which is spaced apart from said crack, inserting a first bolt in said one bracket aperture and said passage, threadedly sceuring said first bolt in said second hole thereby securing said bracket to said bearing ring with said web and servomotor therebetween, drilling and tapping a third bolt hole in said web in registry with the aperture in said other bracket end portion, inserting a second bolt in said other bracket aperture, threadedly securing said second bolt in said third bolt hole, and tightening said second bolt whereby said bracket is placed in tension longitudinally thereof to close said crack.

6. The method of repairing an automatic transmission case having at least one crack in a web thereof comprising the steps of removing a bolt securing the rear servomotor to said web from opening in said servomotor and uncovering a first threaded bolt hole in said web which is bottomed by a bearing ring and a second unthreaded hole in said bearing ring, tapping said second hole in said bearing ring, providing a repair bracket having opposite end portions and an intermediate portion therebetween, each of said end portions having an aperture therein, positioning said bracket with one of said end portions over said servomotor with the respective one of said bracket apertures in registry with said opening and first bolt hole and with the other of said bracket end portions and intermediate portion being spaced apart from said web and servomotor, said other bracket end portion being over a portion of said web which is spaced apart from said crack, inserting a first bolt in said one bracket aperture, said opening in said servomotor and said first bolt hole, and threadedly securing said first bolt in said second hole thereby sceuring said bracket to said bearing ring with said web and servomotor therebetween, said first bolt being immovable in said one aperture, opening and first bolt hole thereby rendering said bracket, web, servomotor and ring immovable with respect to each other, drilling and tapping a third bolt hole in said web in registry with the other bracket aperture in said other end portion of said bracket, inserting a second bolt in said other bracket aperture and threadedly securing said second bolt in said third bolt hole, and tightening said second bolt whereby said bracket is placed in tension longitudinally thereof to close said crack.

7. The method of repairing an automatic transmission case having at least one crack in a web thereof comprising the steps of providing a repair bracket having opposite end portions and an intermediate portion therebetween, securing one of said end portions of said bracket to a bearing ring secured in said web with said web and a portion of the rear servomotor therebetween, said bracket, web, servomotor and ring being immovable with respect to each other, said other bracket end portion being over a portion of said web which is spaced from said crack, said other bracket end portion and intermediate portion being spaced apart from said servomotor and said web, securing said other bracket end portion to said web, and placing said bracket in tension longitudinally thereof.

8. In an automatic transmission of the class wherein the transmission is housed in a transmission case having a bottom surface, a web dividing the interior of said case into two portions, a threaded opening in said web communicating with said surface, and at least one crack in said web, and which includes a rear clutch cylinder positioned in one of said case portions, a bearing ring secured in said web, a tightenable rear clutch band partially surrounding said rear clutch cylinder, said clutch band being secured at one end to said case, and a servomotor having a mounting ear with a hole therein, said servomotor being secured to and in suspension between said case and said web with said mounting ear hole in registry with said web opening, said servomotor having a fluid actuated portion connected to the other end of said clutch band which when actuated secures said clutch band to said cylinder and opens said crack; the combination with said web and servomotor of an elongated repair bracket having end portions and an intermediate portion therebetween, said end portions being spaced from each other in directions longitudinal and lateral of said bracket and perpendicular to said longitudinal and lateral directions, each of said end portions having an aperture therein, a cylindrical spacer having a passage extending therethrough and an exterior threaded portion adjacent one end thereof, said spacer being threadedly secured in said opening in said web and extending into said hole in said ear, one of said end portions of said bracket overlaying said mounting ear with the respective one of said apertures being in registry with said hole therein, a first bolt being positioned in said one bracket aperture and said spacer passage and being secured to said bearing ring thereby securing said bracket to said ring with said web and ear therebetween, said intermediate and other end portions of said bracket being spaced apart from said ear, servomotor and web, said web having a second threaded opening therein in registry with the other bracket aperture and spaced apart from said crack, and a second bolt positioned in the other bracket aperture and second web opening and threadedly secured to said web thereby securing said other end portion of said bracket to said web, said bracket being in tension longitudinally of said bracket, whereby said bracket closes said crack and minimizes the opening of said crack when said servomotor is actuated.

9. The method of repairing an automatic transmission case having at least one crack in a web thereof comprising the steps of removing a first bolt securing the rear servomotor to said web from an opening in said servomotor and uncovering a first threaded bolt hole in said web bottomed by a bearing ring and a second unthreaded hole in said bearing ring, tapping said second threaded hole in said bearing ring from within said first bolt hole, said second hole being coaxial with and having a diameter smaller than said first hole, providing a cylindrical spacer having an interior passage extending therethrough, threadedly inserting said spacer into said first bolt hole securing the same therein, said spacer having a portion extending beyond said web, placing said rear servomotor in its original position with said spacer portion extending into said opening in said servomotor, providing a repair bracket having opposite end portions and an intermediate portion therebetween, each of said end portions having an aperture therein, positioning said bracket with one of said end portions over said servomotor with the respective one of said bracket apertures in registry with said spacer passage and with the other of said bracket end portions and said intermediate portion being spaced apart from said web and servomotor, said other bracket end portion being over a portion of said web which is spaced from said crack, inserting a first bolt in said one bracket aperture and said passage and threadedly securing said first bolt in said second hole thereby securing said bracket to said bearing ring with said web and servomotor therebetween, drilling and tapping a third bolt hole in said web in registry with the aperture in said other bracket end portion, inserting a second bolt in said other bracket aperture and threadedly securing said second bolt in said third bolt hole, and tightening said second bolt whereby said bracket is placed in the tension longitudinally thereof to close said crack.

References Cited

UNITED STATES PATENTS

| | | | |
|---|---|---|---|
| 1,703,111 | 2/1929 | Kniatt | 29—402 |
| 2,361,106 | 10/1944 | Jensen | 29—402 |
| 3,039,182 | 6/1962 | Harmon | 29—402 |
| 3,257,134 | 6/1966 | Boyd et al. | 29—150 |

THOMAS H. EAGER, *Primary Examiner.*